April 21, 1942.                E. MUEHLECK                2,280,252
                        PRODUCING REINFORCED CONDUIT
                            Filed July 4, 1939
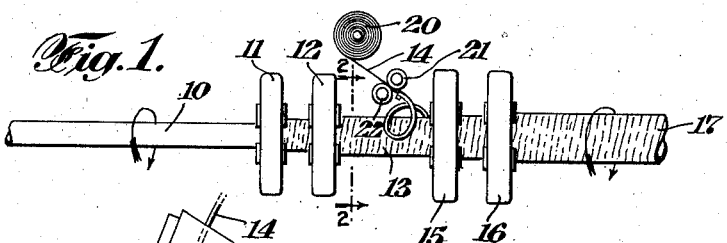
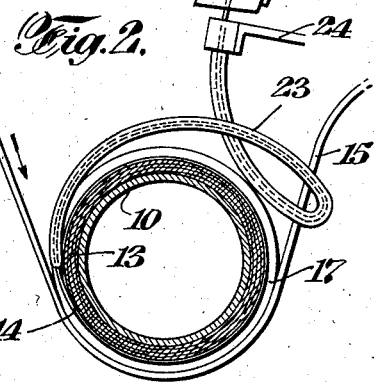
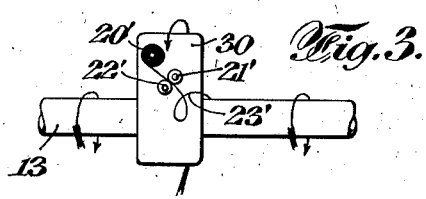
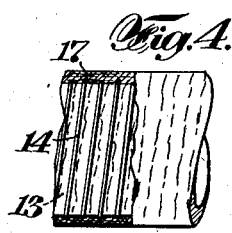
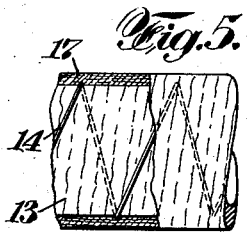
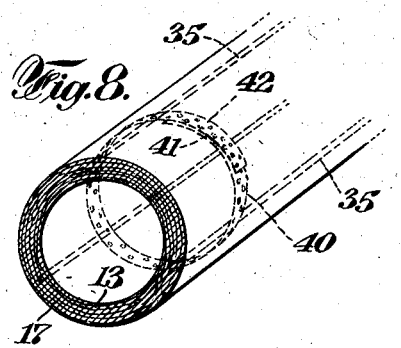
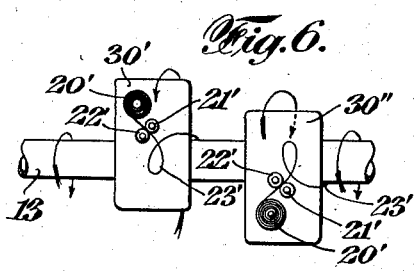
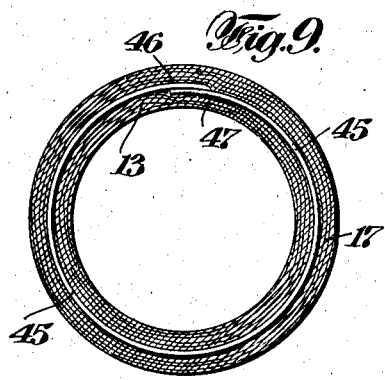
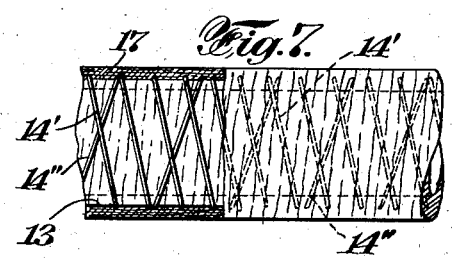
INVENTOR
Ernest Muehleck
BY
Edwards, Bower & Tool
ATTORNEYS Patented Apr. 21, 1942

2,280,252

UNITED STATES PATENT OFFICE 2,280,252

PRODUCING REINFORCED CONDUITS

Ernest Muehleck, Rydal, Pa., assignor to Keasbey & Mattison Company, Ambler, Pa., a corporation of Pennsylvania Application July 4, 1939, Serial No. 282,831

4 Claims. (Cl. 154—2)

This invention relates to the reinforcement of pipes or conduits fabricated of cement and fiber composition, and particularly to such pipes and conduits built up of layers of such composition in plastic form and thereafter hardened by setting of the cement.

The object of the invention is to produce a pipe or conduit of accumulated fiber-cement layers with an intermediate reinforcement embedded in the structure between the inner and outer layers.

Further objects of the invention relating to the details of the procedure and to the particular mechanism provided to preform the reinforcement and feed it between the layers of the pipe or conduit structure will appear from the following description taken in connection with the accompanying drawing, in which Fig. 1 is a diagrammatic view illustrating the series of operations accumulating the layers of fiber-cement with the reinforcements interposed between them;

Fig. 2 is a transverse sectional view on enlarged scale taken approximately on the line 2—2 of Fig. 1;

Fig. 3 is a partial diagrammatic view of a modified form of reinforcement supply means;

Figs. 4 and 5 are partial sectional views of conduit structures illustrating different forms of reinforcement;

Fig. 6 is a diagrammatic view similar to Fig. 3 illustrating a further modification;

Fig. 7 is a partial sectional view of a conduit structure illustrating a further modification of the reinforcement;

Fig. 8 is a perspective view of a portion of a conduit illustrating another type of reinforcement; and Fig. 9 is a sectional view of a conduit structure illustrating a modified form of cylindrical reinforcement having overlapping interlocked ends.

The diagrammatic showing of Fig. 1 illustrates the formation of a fiber-cement pipe structure in accordance with the processes disclosed in Rocca Patents 1,871,917 of August 16, 1932 and 2,022,009 of November 26, 1935 for the formation of fiber-cement pipes or conduits by spirally winding accumulated layers of the composition in plastic form. A mandrel 10 moving from left to right receives overlapping layers of fiber-cement film from the supply belts 11 and 12 forming the inner portion 13 of the pipe or conduit structure.

The formation of the inner accumulated layers of the structure is under pressure of the film supply means, and this compacted layer is then supplied with a winding of reinforcing wire 14 as the mandrel 10 with its accumulated layer 13 rotates and moves to the right to receive the accumulation of outer layers 17 of fiber-cement from the supply belts 15 and 16 completing the pipe or conduit structure and embedding the reinforcement 14 between the inner and outer accumulations.

In the specific example illustrated in Figs. 1 and 2 the reinforcing wire 14 is a flat ribbon-like strip supplied from the reel 20 to the swaging or bending rolls 21, 22 which pinch the wire to slightly less thickness along one edge and so cause it to curve into helical convolutions following generally the contour of the guide tube 23 mounted on supporting bracket 24 and leading the flat swaged wire to the periphery of the inner conduit layer 13 as illustrated more in detail in Fig. 2. In this way the flat wire is wrapped in helical form around the inner layer 13 and slightly embedded therein, the rate of feed of the wire 14 being accurately controlled to correspond closely to the peripheral speed of the surface of the tube 13.

The mandrel with the tube 13 and the reinforcement 14 continuously rotates and moves to the right to receive the outer layer 17 from the supply belts 15 and 16, after which the mandrel 10 with the entire pipe or conduit structure feeds out of the machine and is removed. The reinforced pipe structure is then stripped from the mandrel 10 and after pressing between an inner re-inserted mandrel and an outer cylindrical die is permanently hardened by setting of the cement.

The fibrous material may be asbestos, slag, wool, or the like, and the cement may be Portland cement or other binders of calcareous cement, such as hydraulic lime, natural cement, pozzuolanic cements, calcareous hydraulic cement, or the like, and the Portland or other cement may be mixed with siliceous materials, such as quartz, quartzite, siliceous sand and shingle, sandstone granites, natural and artificial pozzuolana, trass, slags, and the like. The pressure during the accumulation of successive layers in the final completed construction compacts the fibrous and cementitious material strongly together and snugly embeds the reinforcement in place to give a very intimate adhesion between all of the elements of the structure.

In Fig. 3 a modification is illustrated in which the reinforcement winding mechanism is mounted on a rotary housing 30 turning on an axis corresponding to that of the mandrel 10 and adapted to rotate in a direction either opposite to the rotation of the mandrel or in the same direction. This rotatable housing 30 carries the supply reel 20', bending or swaging rollers 21', 22' and the reinforcement guide 23', and when it is rotated in a direction opposite to that of the mandrel as indicated in Fig. 3, it will lay down the wire 14 with a relatively finer pitch as indicated in Fig. 4. When it is rotated in the same direction as the mandrel 10, it will give the wire reinforcement 14 a much greater pitch as indicated in Fig. 5. In either case, the relative speeds of rotation of the mandrel 10 and the housing 30 may be widely varied to control the pitch of the reinforcement.

If desired, two housings 30' and 30" similar to housing 30 may be provided rotating in opposite directions as indicated in Fig. 6 and laying down two reinforcements, 14' and 14", one within the other, as illustrated in Fig. 7, the relative pitches of these reinforcements being controlled to give any desired lead of the one over the other.

As illustrated in Fig. 8 longitudinal reinforcing strands 35 may be provided, for instance, by a supply housing positioned in the space between the belts 12 and 15 and turning at the same speed as the mandrel 10 and carrying supply reels, one for each longitudinal rod 35, and having guides feeding these strands on to the surface of the accumulated inner layer 13. These longitudinal strands are guided to be held to the surface of the inner layer and slightly impressed therein and fed into the space within the outer accumulating belts 15 and 16 so that the outer layers 17 are wrapped over the longitudinal strands which are thus embedded in place between the outer and inner sheaths of the pipe or conduit.

Instead of feeding the intermediate reinforcement into place helically or longitudinally, as previously described, circular or cylindrical reinforcement may be applied to the inner layer 13 between the first and second series of accumulating belts. For instance, as illustrated in Fig. 8, circular bands 40 of perforated metallic tape may be sprung around the inner sheath 13 with overlapping ends 41, 42 snugly hugging and indenting the inner layer and receiving the outer layer 17 so that when these layers are subjected to radial pressure in the final pressing operation the fiber-cement composition will protrude through the perforations of the bands and lock the ends 41, 42 together.

If desired a large interval may be left between the inner accumulating stage and outer stage so that between these the inner sheath 13 may be enclosed within a complete cylinder 45 of openwork material corresponding substantially to the length of the final pipe or conduit section, the ends of the cylinder being overlapped and interlocked by opposite projections 46 and 47. This entire inner structure then continues on to the final accumulating belts 15 and 16 superposing the outer layer 17 and completing the structure.

Instead of a flat wire 14 round wire or other form of wire may be substituted by correspondingly changing the swaging roll set-up to a roll combination including a three roll bending operation imparting a helical form to the wire so that it coils in place around the inner plastic cylinder 13. The invention is not confined to the specific embodiments shown but is intended to include such equivalents thereof as fall within the scope of the appended claims.

I claim:

1. A process for production of a reinforced pipe or conduit of fiber cement composition comprising accumulating successive layers of an unset plastic fiber cement composition to build up a pipe or conduit into a plastic cylinder, shaping a metallic wire or strand into the form of a helix independent of the pipe or conduit and adapted to fit the surface thereof, and feeding said helix on to the plastic cylinder while the latter is in a plastic condition by flexing the coils of the helix within their elastic limit and permitting them to reflex into engagement with the surface of said cylinder.

2. The process as set forth in claim 1 in which the application of the reinforcement is followed by accumulation on the periphery of said inner cylinder and reinforcement of additional outer layers of fiber cement composition so that the reinforcement is embedded between inner and outer portions of the pipe or conduit in plastic condition.

3. A process for production of a reinforced pipe or conduit of fiber cement composition comprising continuously accumulating successive layers of unset plastic fiber cement composition to build up a pipe or conduit into a plastic cylinder of indefinite length, simultaneously and continuously shaping a metallic wire or strand into the form of a helix independent of the pipe or conduit and of indefinite length and adapted to fit the surface of the plastic cylinder, and continuously feeding said helix on to the plastic cylinder during the formation of the latter and while it is in a plastic condition by flexing the coils of the helix within their elastic limit and permitting them to reflex into engagement with the surface of said cylinder.

4. The process as set forth in claim 3 in which the application of the reinforcement is accompanied by continuous accumulation on the periphery of said inner cylinder and reinforcement of additional outer layers of fiber cement composition so that the reinforcement as it is applied is continuously embedded between the inner and outer portions of the pipe or conduit in plastic condition simultaneously with the formation of said inner and outer portions.

ERNEST MUEHLECK.